No. 886,148. PATENTED APR. 28, 1908.
G. MÜCKE.
SIGNALING DEVICE FOR INCUBATORS.
APPLICATION FILED DEC. 31, 1907.

Witnesses:
A. S. Kitchin
J. J. Mawhinney

Inventor
George Mücke
By
Mason Fenwick & Lawrence
his attys.

UNITED STATES PATENT OFFICE.

GEORG MÜCKE, OF REISENBERG, AUSTRIA-HUNGARY.

SIGNALING DEVICE FOR INCUBATORS.

No. 886,148.　　　Specification of Letters Patent.　　　Patented April 28, 1908.

Application filed December 31, 1907. Serial No. 408,832.

*To all whom it may concern:*

Be it known that I, GEORG MÜCKE, manufacturer, a subject of the Emperor of Austria-Hungary, and a resident of Reisenberg, Lower Austria, in the Empire of Austria-Hungary, have invented Improvements in Signaling Devices for Incubators; and I do hereby declare the following to be a full, clear, and exact description of the invention, such as will enable others skilled in the art to which it appertains to make and use the same.

This invention relates to improvements in signaling devices, and particularly to signaling devices used in incubators, and has for an object the provision of means for indicating the condition of the eggs in the incubator.

Another object in view is the provision of a signaling device for incubators arranged to sound an alarm when the eggs in the incubator have reached a predetermined temperature either from an outside heating means or from the life contained therein.

Figure 1:
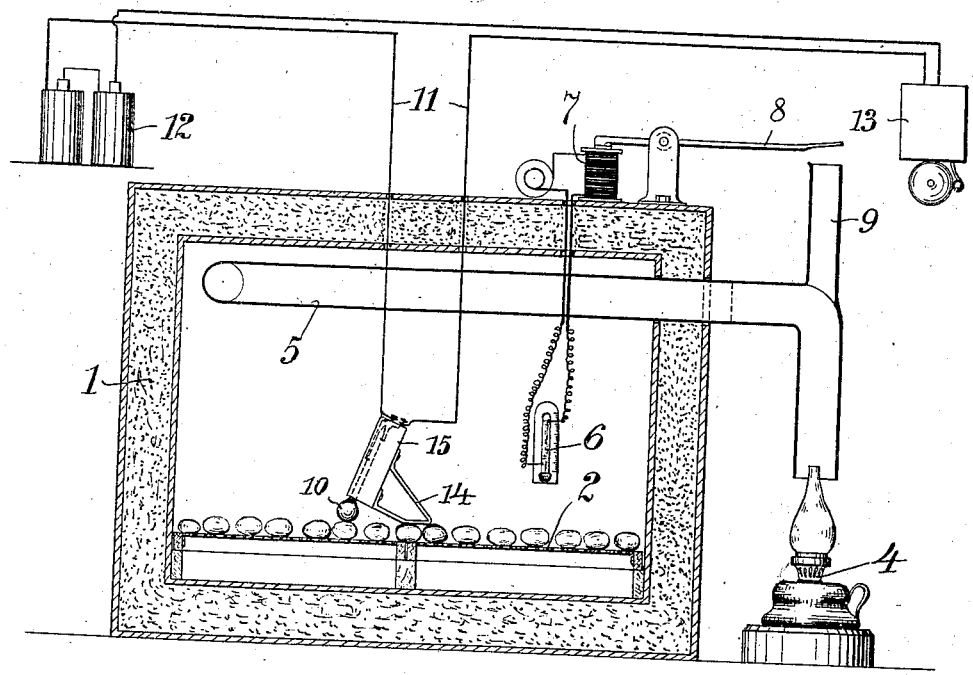
Figure 2:
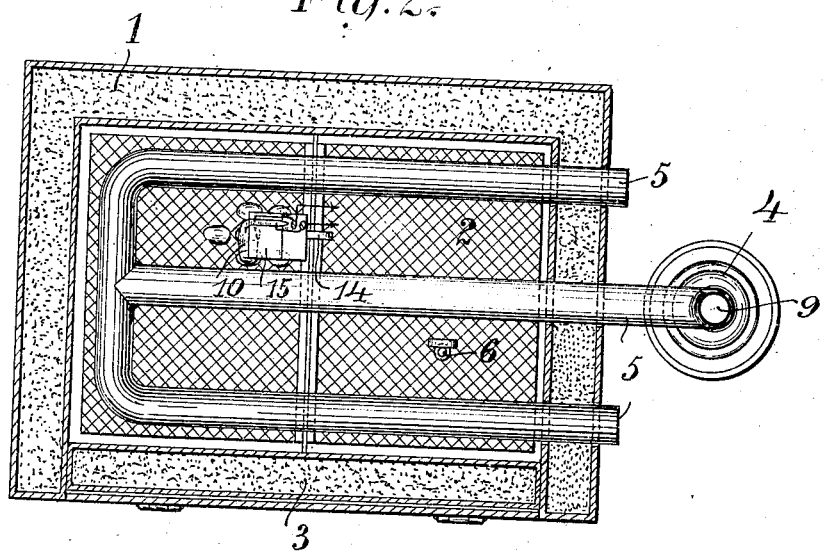

A still further object in view is the provision of a signaling device adapted to sound an alarm when the eggs have reached a predetermined temperature, in combination with automatic means for regulating the heat for heating the incubator.
With these and other objects in view the invention comprises certain novel constructions, combinations, and arrangement of parts as will be hereinafter more fully described and claimed.
In the accompanying drawings: Figure 1 is a vertical longitudinal section through an incubator showing my invention applied thereto. Fig. 2 is a section through Fig. 1, approximately on line 2—2.
In constructing an incubator the same is provided with walls 1, preferably double and having a filling 3 of heat non-conducting material in between the walls for preventing the radiation of heat from the interior of the incubator. A suitable egg support as 2 preferably of wire mesh is provided and spaced above the floor so that the air in the incubator may be passed entirely around the eggs contained therein for uniformly heating the same. The eggs may be inserted and removed and the interior of the incubator may be reached by a suitable door of any construction, as seen in Fig. 2.

In order to provide proper heat for the incubator a lamp 4 of any desired kind may be used, preferably an ordinary oil lamp that has a chimney thereon, extending into a pipe 5 that passes upward from lamp 4 to near the top of the incubator and then into and through the incubator and to the opposite end thereof where it is formed into return passage ways, as clearly seen in Fig. 2. The return passage ways are designed to discharge into the atmosphere on the outside of the incubator. Passing upward from tube 5 that is positioned above lamp 4 is an auxiliary tube 9 that is in free communication with tube 5 and directly in line with and above the chimney or lamp 4. This is to provide a draft or passage way for the heat from lamp 4 to be diverted from pipe 5 and return pipe positioned in the incubator. A cover or damper 8 is pivotally mounted upon the incubator and designed to rest against the top of tube 9 when it is desired that heat shall pass from lamp 4 to pipe 5 and heat the incubator. The damper 8 extends over and has an armature secured thereto which is designed to be operated by magnet 7 for opening damper 8 in order to divert the heat from pipe 5 to pipe 9 and from thence to the atmosphere. Magnet 7 is connected to a suitable source of current and also to a thermometer 6 positioned in the incubator and arranged to have one of the connecting wires continuously in contact with the lower part of the mercury and the other connecting wire so positioned as to be brought in contact with the mercury when the same has reached a predetermined level by reason of the rise of temperature in the incubator. When the mercury in thermometer 6 has reached a predetermined level magnet 7 will be energized and attract an armature positioned on damper 8 which in turn will cause the damper 8 to be moved off pipe 9. This will prevent any further heating of the incubator as the heat will pass out through pipe 9 into the atmosphere and avoid the tortuous passage through the incubator. Positioned within the incubator is a second thermometer secured to a supporting block, preferably of wood, as 15 and having an enlarged bulb at the end bent over at 10 at substantially right-angles to the remaining portion of the thermometer. The bent over portion 10 is designed to be of considerable length as seen in Fig. 2 so as to contact with one or more of the eggs in order to cause the thermometer to act or indicate correctly the heat of the eggs. A bracing member 14 is provided for holding block 15 in position as seen in Fig. 1 for permitting the enlarged portion 10 of the thermometer to rest firmly against one or more eggs but not to sustain the entire pressure of the block 15. Connected to the thermometer positioned in block 15 are wires 11 which also are connected to a source of current 12 and to an alarm, as bell 13. One of the wires 11 is connected to the thermometer held by block 12 in such a manner as to be continuously in contact with the mercury therein, while the other wire is so connected as to be only brought into contact with the mercury when the egg or eggs against which the same is resting has reached a predetermined temperature. By this construction and arrangement of thermometers an incubator heating means is provided that will keep the incubator at any desired temperature and in addition has an alarm or signaling device to indicate when the eggs have reached a predetermined temperature.

In the incubation of eggs of poultry it is well known that the same is divided into two periods, the first being when the eggs are to receive heat, and the second when the eggs give off heat. In the first instance the eggs must be heated by any desired heating means, and the second the eggs are heated by the life therein, in addition to the auxiliary or outside heating means. Ordinarily the eggs in the first period, for instance about fourteen days, act in almost exactly the opposite way in which they act in the second period, or last eight days. In the last eight days, the eggs generate heat by reason of the life contained therein and the natural heat will cause the eggs to become hotter than the atmosphere surrounding them. By reason of these facts it is always necessary to cool the eggs at approximately the proper time so that the same may not become too highly heated and kill the life therein. In the signaling device heretofore set forth means are provided for indicating the heat of the eggs, regardless of the temperature of the surrounding air, so that when the temperature of the eggs exceeds the temperature of the surrounding atmosphere an alarm will be sounded to indicate such fact. In using this alarm the same is designed to operate for sounding an alarm when the egg begins to generate heat from within so that the heat from lamp 4 may be cut off or regulated so as to provide less heat for the incubator. In this way at the proper time the temperature of the incubator lowers so that the eggs may be in a proper environment or temperature for properly hatching.

What I claim is:

1. In an alarm for incubators, a receptacle for receiving eggs, an electrically operated alarm, a circuit for said alarm including a source of current, and means contacting with the eggs in said receptacle for closing said circuit, said means comprising a thermometer having an indicating portion and a bulb bent at right angles to said indicating portion for forming a comparatively large contact portion for contacting with the said eggs, said circuit being connected to different parts of said thermometer thereby upon the rise of the mercury in the thermometer said circuit will be closed for permitting said source of current to operate said alarm.

2. A signaling device for incubators, comprising a receptacle, for containing eggs, an alarm, a source of current, means for connecting said source of current to said alarm, and a thermostat connected to said connecting means, said thermostat being formed with an indicating portion and a contact portion, said contact portion being designed to be in contact with the eggs in said receptacle for causing the thermostat to indicate the temperature thereof, the rise of the mercury in said thermostat above a predetermined point being designed to complete the circuit of said current for operating said signal.

In testimony whereof I have signed my name to this specification in the presence of two subscribing witnesses

GEORG MÜCKE.

Witnesses:
FRANZ REITER,
ROBT. W. HEINGARTNER.